United States Patent [19]

Hoelzl

[11] Patent Number: 5,051,173
[45] Date of Patent: Sep. 24, 1991

[54] DEVICE TO REMOVE OIL FROM OIL FILTER

[76] Inventor: Robert J. Hoelzl, 6141 W. Lisbon Ave., Milwaukee, Wis. 53210

[21] Appl. No.: 504,566

[22] Filed: Apr. 4, 1990

[51] Int. Cl.⁵ ............................................. B01D 21/30
[52] U.S. Cl. ........................ 210/143; 210/393; 210/409; 210/410; 210/416.1; 210/797; 210/798
[58] Field of Search ............ 210/797, 798, 410, 416.1, 210/409, 332, 143, 393; 134/37; 15/304, 316.1

[56] References Cited

U.S. PATENT DOCUMENTS

| | | | |
|---|---|---|---|
| 1,827,258 | 10/1931 | Payzant | 269/25 |
| 2,919,704 | 1/1960 | Butler | 210/393 |
| 3,044,475 | 7/1962 | Thompson | 15/304 |
| 4,341,633 | 7/1982 | Waider | 210/143 |

Primary Examiner—Robert A. Dawson
Assistant Examiner—David A. Reifsnyder
Attorney, Agent, or Firm—Nilles & Nilles

[57] ABSTRACT

A device which employs high pressure air to remove oil from a used oil filter of a motor vehicle. High pressure air directed into a central core of an oil filter forces out oil in the filter, thereby permitting the filter to be disposed of in an environmentally safe manner, without the concern that oil may leak from the filter and cause contamination.

9 Claims, 3 Drawing Sheets

DEVICE TO REMOVE OIL FROM OIL FILTER

BACKGROUND OF THE INVENTION

1. Field of the Invention

This invention relates to a device and method for removing oil from an oil filter. In particular, the invention relates to the use of high pressure air to blow oil out of an oil filter of the kind used in a motor vehicle so that the filter may be disposed of in an environmentally safe manner.

2. Description of the Related Art

Proper maintenance of a motor vehicle requires periodic, regular oil changes and replacement of the oil filter. A used oil filter naturally has no further use on the motor vehicle, and so it must be disposed of in some manner. One standard method of disposal of an oil filter is to simply throw it in the trash can and let the garbage hauler dump it in a landfill. Increasing concern over the environment, however, has drawn attention to the disposal of used motor oil, including the disposal of oil filters.

Most landfills do not accept liquids for disposal, especially used motor oil. While the oil filter itself is not a liquid, the oil within it certainly is a liquid. Efforts are being directed at recovering engine waste oil after it has been used and removed from the engine or crankcase of a motor vehicle for proper disposal or recycling. Some states are even mandating by statute the recovery of engine waste oil and restricting disposal of products containing engine waste oil, as for example in Wisconsin by Wis. Stat. Section 144.48, with even more stringent laws recently considered by the Wisconsin Legislature in Senate Bill SB-300.

During an oil change at a service station, only some of the oil can be removed from an oil filter by tipping the filter over and pouring the oil out. Pouring oil out is very ineffective since a significant amount of oil will initially remain in the filter, but then drip out over time. At some service stations which do a significant amount of business in oil changes and throw a large number of used oil filters into a trash bin, a rather large amount of oil has been seen dripping down to the bottom of the bin and pouring out when the bin is dumped into a garbage truck. These filters will continue to drip oil even after disposal at a landfill thus contributing to the difficult problems of contamination at such sites.

Filters of all kinds are obviously used in many applications, and some methods are available to clean some types of filters, but the applicant is aware of virtually no prior art relative to the use of high pressure air for removing oil from an oil filter. For example, U.S. Pat. No. 2,862,622 relates to a filter for a dry cleaning machine in which solid matter is filtered from a cleaning solvent, such as perchloroethylene. This device has a filter body which consists of two vertical cylinder sections 1 and 2 separated by a diaphragm plate 5 having multiple apertures for tubes of fine wire mesh 9. During normal operation the solvent passes from the bottom of the tank upward through the filter tubes 9 where the fine wire mesh filters out particles in the solvent. The filter tubes 9 are cleaned by shutting off the flow of solvent through the tank, and gravity draining the remaining solvent in the tank. The draining has the effect of reversing the flow of fluid through the filter tubes 9, which removes dust and lint collected on the tubes.

U.S. Pat. No. 3,087,622 relates to an oil filter having a means for cleaning the filter. This patent shows a series of levers and valves 45, 50, 55, 60 and 65 which operate so as to shut off the flow of engine oil, and alternately flow a cleaning liquid through the filter. The patent does not show how to effectively remove oil from a standard oil filter used in modern motor vehicles so it may be disposed of in an environmentally safe manner.

U.S. Pat. No. 4,214,882 relates to a portable industrial air cleaner 10 for removing dust from dust-laden air. It shows reverse pulse air valves 152 and 154 disposed within the housing 12 to direct a pulse of cleaning air into the filter passageways 94 and 96 to dislodge dust collected by the filters 86 and 88.

U.S. Pat. No. 4,265,771 relates to an alluvial filter having candle-like filtering elements 14 for filtering ash components from highly viscous liquids such as pitch, liquefied coal, tar and the like. The filter operates at working temperatures of approximately 350° C. The device uses pressurized gas to dislodge debris from the filter candles 14.

U.S. Pat. No. 4,834,883 concerns an apparatus for cleaning a swimming pool filter 10 which has a number of porous filter tubes 13 extending down a large tank 11. The cleaning apparatus 25 consists of a spray nozzle 30 on the end of a wand 26 which is inserted through a drain valve 15 at the bottom of the tank 11, and moved back and forth to spray water up against the bottom of the filter tubes 13. The spray water dislodges contaminants on the filter tubes 13, which drop to the bottom of the tank 11 and flow through the drain valve 15 around the wand 26.

None of the above described devices are useful to remove oil from an oil filter of the kind used in motor vehicles.

The applicant has tried one other effort to remove oil from an oil filter and that was to crush the oil filter with a trash compactor in an attempt to literally squeeze the oil out of the filter. That effort failed, since an oil filter has a strong, rigid body which requires a huge force to crush it. Even a large industrial-size compactor was unable to adequately crush an oil filter to the point where a significant amount of fluid would squeeze out.

SUMMARY OF THE INVENTION

This invention uses high pressure air to literally blow the oil out of a used oil filter. The high pressure air can be supplied from an ordinary air compressor found in most service stations. The device for removing oil from an oil filter by use of high pressure air is simple, low-cost and uses no electrical power. All functions are pneumatically-powered by the high pressure air from the compressor. The method of removing oil from an oil filter using this device is quick, easy, low-cost, and very effective. Approximately 97% of the oil is removed from the filter, with only a very few drops remaining, so that the filter can be safely disposed of in any typical manner, such as dumping it at a landfill without the concern that oil will drip out and cause contamination at the disposal site.

DESCRIPTION OF PREFERRED EMBODIMENTS

Figure 1:
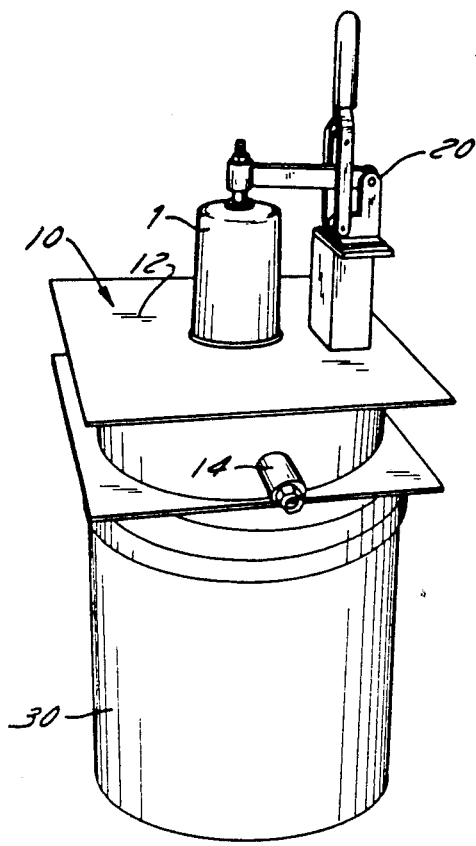
FIG. 1 shows a first embodiment of the invention with an oil filter in place.
Figure 2:
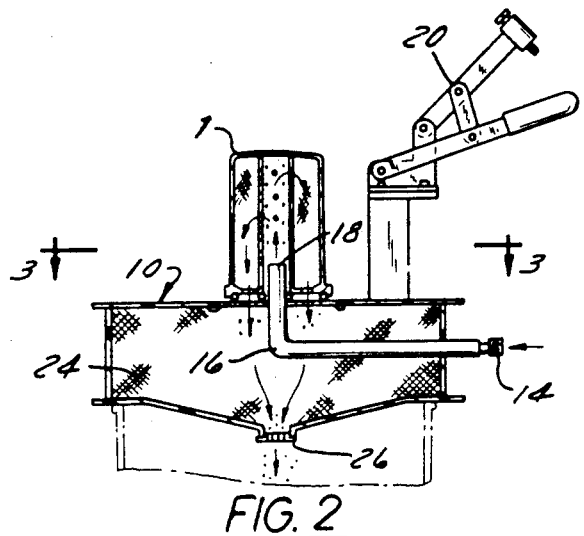
FIG. 2 shows a cross-sectional view of the embodiment shown in FIG. 1.
Figure 3:
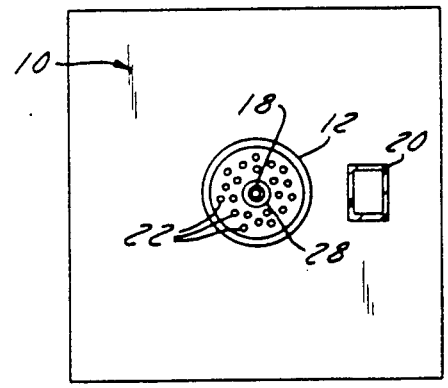
FIG. 3 shows a top view of the embodiment shown in FIG. 2, without an oil filter on the device.
Figure 4:
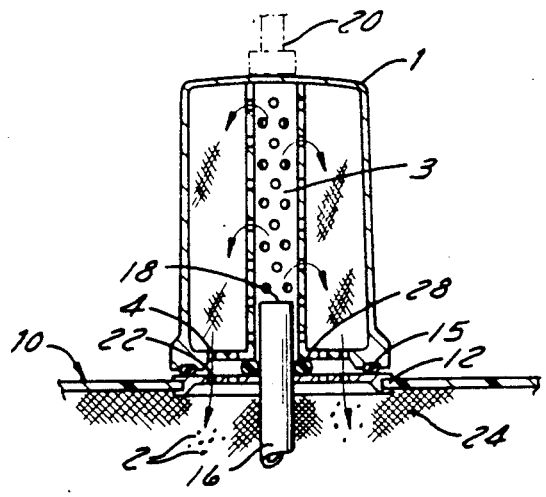
FIG. 4 shows in detail the method in which high pressure air blows oil out of a used oil filter.

FIGS. 1-3 show a very basic, yet effective, low cost embodiment of a device for removing oil from an automotive oil filter. An oil filter 1 of the kind used in motor vehicles ordinarily has a relatively flat top surface on one end and on the other end portion a central core or opening 3, several peripheral openings 4 and a gasket 5. The device has a housing 10 which has a surface 12 for receiving and engaging the oil filter 1 in a sealed relationship. An air outlet 18 having a restricted nozzle with multiple orifices projects out from the upper flat surface 12. The oil filter 1 is placed on top of the surface 12, and positioned so that the central opening 3 of the filter 1 fits over the air outlet 18 and so that the peripheral openings 4 in the bottom end portion of the filter 1 are placed over, although not necessarily in direct alignment with, oil receiving holes 22 in the upper flat surface 12.

A clamp 20 on the housing 10 clamps against the top surface of the filter 1 which provides a means for securing the filter 1 in place. A rubber O-ring 28 at the base of the air outlet 18 provides for a seal between the air outlet 18 and the central opening 3 of the filter 1 so that air and oil will not squirt out. The gasket 5 around the bottom rim provides a seal between the bottom end portion of the filter 1 and the flat surface 12 of the device.

The device has an air inlet 14 on the side of the housing 10 for receiving high pressure air from a compressor. The air inlet 14 is connected by a pipe 16 to the air outlet 18 which provides a means for directing high pressure air into the central opening 3 of the filter 1. The interior of the housing 10 has a wire mesh which acts like a baffle 24 to provide back pressure for the air, which increases the effectiveness of the high pressure air in removing the oil from the filter. The bottom of the housing has a funnel-shaped oil outlet 26 for collecting the oil removed from the filter.

The device operates by attaching a source of high pressure air, such as from an ordinary air compressor used to fill tires with air and power pneumatic tools at a service station, to the air inlet 14. The high pressure air enters the device at the air inlet 14, flows through the pipe 16 and exits through the air outlet 18. The high pressure air is blown into the central opening 3 of the oil filter 1, flows through the filter and forces oil 2 out through the peripheral openings 4 in the bottom of the filter 1 and through the oil receiving holes 22. The oil 2 flows into the housing 10 and through the funnel-shaped oil outlet 26 and down into a bucket or container 30 or other means for collecting the oil.

The device described above was tested on an oil filter which had been used on an automobile. After removing it from the vehicle, the filter was tipped over to manually pour out as much of the oil as possible. The filter was placed on the device and high pressure air was blown through the filter for about seven to ten seconds. The filter was immediately removed from the device and allowed to rest on a sheet of cardboard. After resting on the cardboard for twenty-four hours, only a very small amount of oil dripped out of the filter, just enough to lightly wet the surface of the cardboard; after thirty-six hours, only one or two drops had wetted the cardboard; and after forty-eight hours virtually no oil dripped out of the filter itself although the gasket left a mark on the cardboard. The device was therefore effective in removing at least 97% of the oil from the filter, and the device easily removed enough oil so that the filter could be disposed at a landfill in an environmentally acceptable and safe manner.

Figure 6:
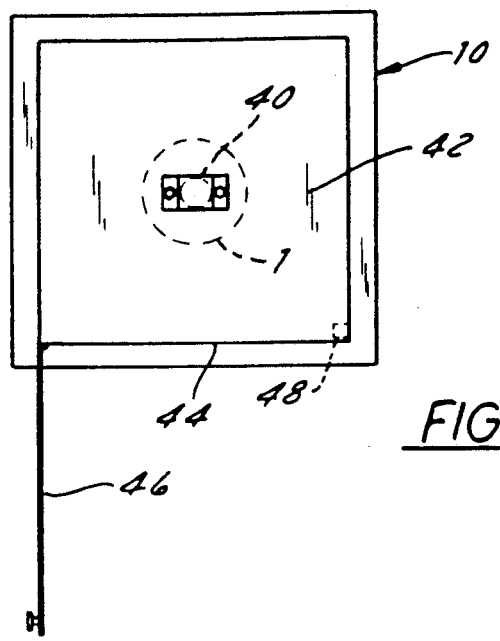
FIG. 6 shows a top view of the embodiment shown in FIG. 5.
Figure 5:
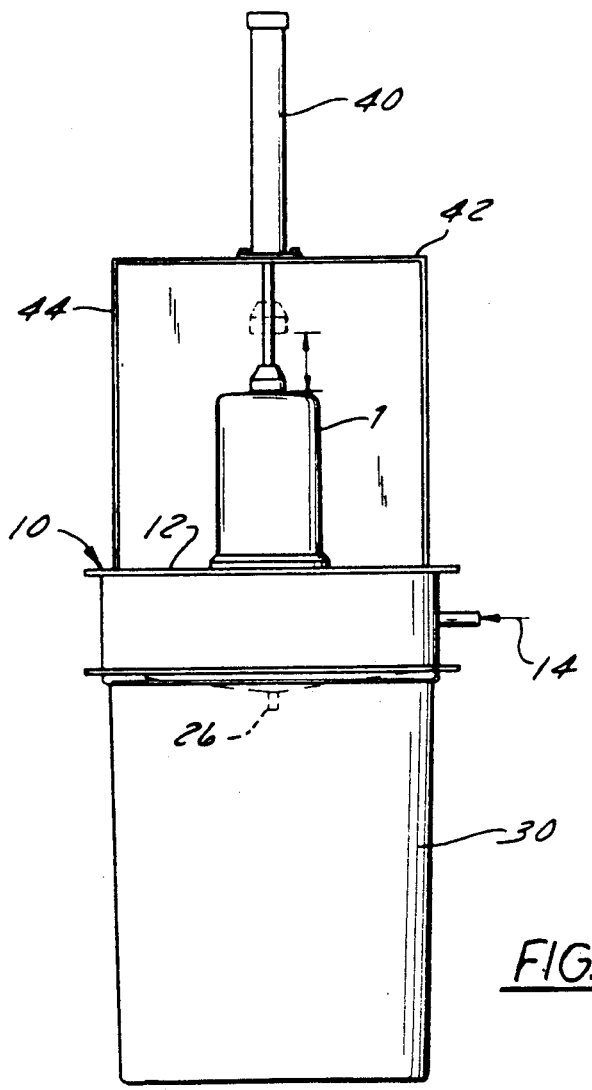
FIG. 5 shows a second embodiment of the invention having the added features of a pneumatic cylinder for clamping the oil filter in place and a pneumatic circuit for automatically operating the device.
Figure 7:
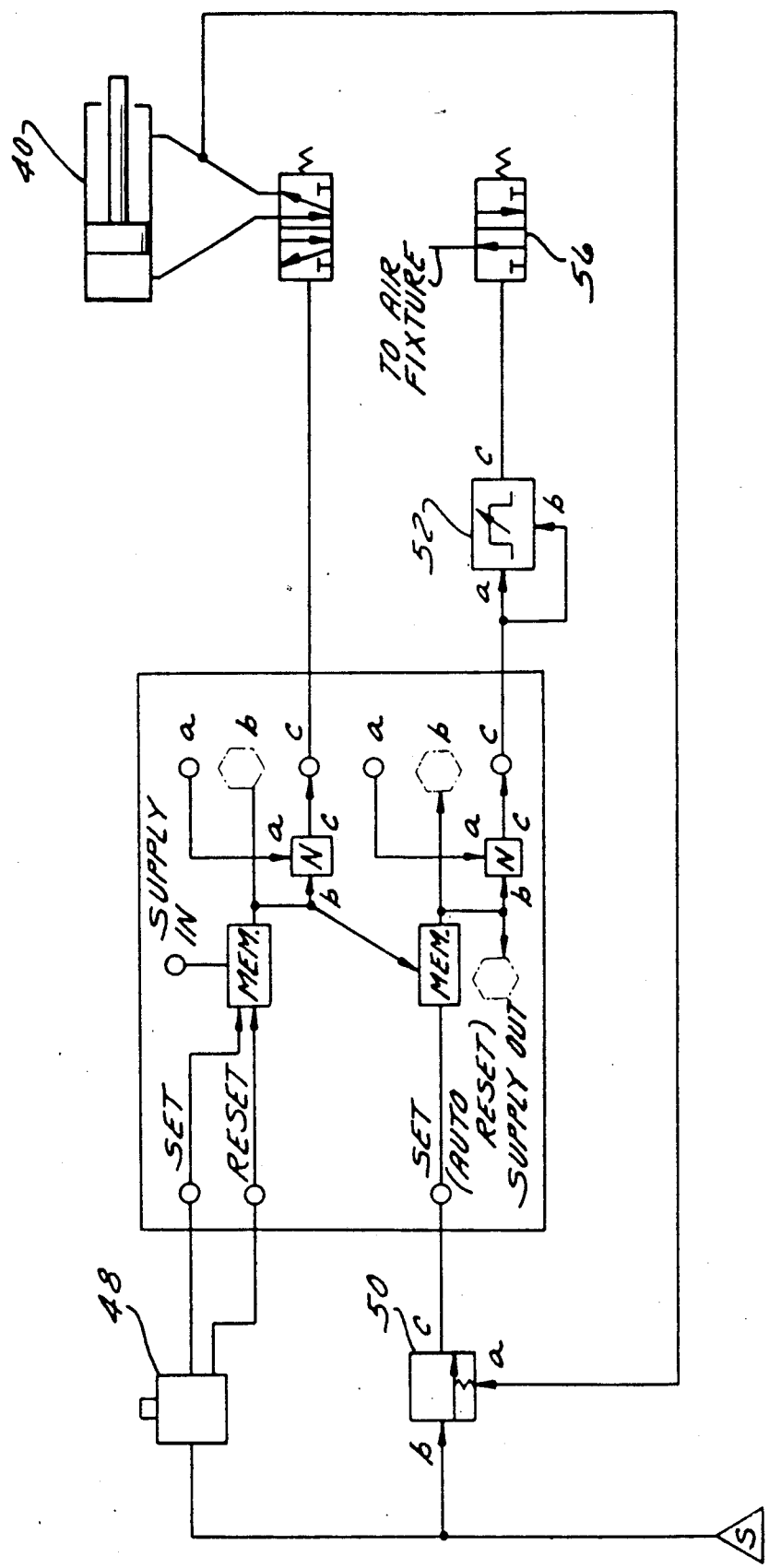
FIG. 7 shows a pneumatic circuit diagram of the pneumatic elements in the embodiment shown in FIGS. 5 and 6.

FIGS. 5-7 show a more elaborate embodiment of the invention, having all of the essential elements shown in FIGS. 1-4, but also incorporating a pneumatic cylinder and a pneumatic circuit for automatically operating the device. Like the first embodiment described above, the second embodiment has a housing 10, a surface 12 for engaging the filter 1, an inlet 14, pipe 16, air outlet 18, oil receiving holes 22, baffle 24, oil outlet 26, an O-ring 28, and a container 30 for collecting oil. Instead of a clamp, the second embodiment has a pneumatic cylinder 40 for securing the oil filter 1 in place. A support bracket 42 connected to the housing 10 extends over the upper flat surface 12 and supports the pneumatic cylinder 40 directly over the air outlet 18. The oil filter 1 is again placed on the upper flat surface 12 with the central opening 3 being slipped over the air outlet 18. The pneumatic cylinder 40 has sufficient clearance over the filter 1 so that the filter 1 can be easily placed on and removed from the device, and has a stroke length adequate to accommodate a range of sizes of oil filters. A door 46 over the front or side of the device protects the operator from any oil that may seep or squirt out during the oil removing process.

The second embodiment also has a pneumatic circuit which automatically operates the device. The pneumatic circuit and its elements, shown schematically in FIG. 7, operate in the following manner. An operator manually loads the filter 1 on the device and closes the door 46, which actuates a pneumatic switch 48. Actuating the pneumatic switch 48 causes the air cylinder 40 to extend down toward the top surface of the filter 1 to secure it in place. An inhibitor, or pressure sensing device 50, upon sensing the clamping of the filter 1 by the air cylinder 40, sends an output signal to open an air blast valve 56, which blasts high pressure air out through the air outlet 18 and into the central opening 3 of the filter 1. A pneumatic timer 52, which is connected to the same air line as the air blast valve 56, times out after a set interval and closes the air blast valve 56. When the operator opens the door 46, the air cylinder 40 retracts from the filter 1 and the cycle of the pneumatic circuit is reset. The operator may then unload the filter 1, reload with another one and repeat the process.

The elements of the pneumatic circuit are all well known in the art and easily available in the market. As for the source of high pressure air, most air compressors at service stations operate at a working pressure of approximately 90 psi or more, which is acceptable for both performing the process of removing oil from an oil filter and for operating most known pneumatic circuit elements. From the discussion above, it is evident that the device and method for removing oil from an oil filter can be done with no electric power to the device.

It is further evident that the invention may be adapted, such as by adding another air outlet 18 and corresponding means for securing a filter, for removal of oil from two or more filters at a time.

Those familiar with oil filters will realize that the path of the air and in turn the path of the oil blown out of the filter—i.e., from the central opening, through the filter and out of the peripheral openings around in the bottom of the filter—is the opposite direction that the oil normally flows when the filter is attached to a motor vehicle.

The above embodiments are considered the best mode by this inventor for carrying out the invention, but other embodiments may also work. A similar device may be constructed by directing high pressure air into one or more of the peripheral openings and blowing the air out through the central core or central opening, or create the proper air flow in one direction or the other through the use of a strong vacuum.

What is claimed is:

1. An apparatus for removing oil from an oil filter of the type that includes a top surface and an end portion having a central opening and peripheral openings comprising:
    a housing having an upper flat surface for engaging said end portion of said oil filter;
    clamping means on said upper flat surface for securing said oil filter in sealed relation thereto;
    an air outlet projecting out from said upper flat surface so that when said oil filter is engaged on said upper flat surface, said air outlet projects into said central opening of said oil filter, and said air outlet being attachable to a source of high pressure air, said high pressure air being injectable into said central opening and having the effect of forcing oil contained in said oil filter out through said peripheral openings in said oil filter;
    said upper flat surface having oil receiving holes in fluid communication with said peripheral openings in said filter for receiving oil forced out from said peripheral openings; and
    a container below said oil receiving holes for collecting said oil forced out by said high pressure air from said oil filter.

2. An apparatus for removing oil from an oil filter according to claim 1, wherein said clamping means for securing said oil filter comprises a clamp which is connected to said upper flat surface of said housing, and engageable with said top surface of said oil filter.

3. An apparatus for removing oil from an oil filter according to claim 1, wherein said clamping means for securing said oil filter comprises a pneumatic cylinder connected to said upper flat surface of said housing and engageable with said top surface of said oil filter.

4. A device for removing oil from an oil filter of the type that includes an end portion having a central opening, peripheral openings and a gasket, comprising:
    a housing having an upper flat surface for accepting an oil filter and for uniformly engaging said gasket on said oil filter so as to form a seal between said upper flat surface and said gasket;
    a pneumatic cylinder for securing said oil filter on said upper flat surface;
    a bracket attached to said housing for supporting said pneumatic cylinder above said upper flat surface;
    an air inlet for receiving high pressure air;
    an air outlet having a restricted nozzle projecting out from said upper flat surface for directing said high pressure air from said air inlet into said central opening of said oil filter, said high pressure air having the effect of forcing oil contained in said oil filter out through said peripheral openings of said oil filter;
    a rubber O-ring at the base of said air outlet sealable with the edge of said central opening of said oil filter;
    said upper flat surface having oil receiving holes for receiving oil removed from said oil filter into an interior of said housing below said upper flat surface;
    a wire mesh baffle within the interior of said housing, and
    a container below the interior of said housing for collecting oil removed from said oil filter.

5. A device for removing oil from an oil filter according to claim 4, wherein said pneumatic cylinder is operable from said high pressure air received by said air inlet.

6. A device for removing oil from an oil filter according to claim 5, further comprising a pneumatic control circuit for automatically cycling said device to remove oil from an oil filter.

7. A device for removing oil from an oil filter according to claim 6, further comprising a cover and door for enclosing said oil filter.

8. The device for removing oil from an oil filter according to claim 7, wherein said pneumatic control circuit comprises:
    a pneumatic switch on said door;
    said pneumatic switch being actuatable upon closure of said door so as to cause said air cylinder to extend down upon the top of said filter;
    an inhibitor for sensing the pressure in said air cylinder;
    an air blast valve openable upon said inhibitor sensing a predetermined pressure valve within said air cylinder for blasting high pressure air out through said air outlet and into said central opening of said filter;
    a pneumatic timer for closing said air blast valve after a set time interval; and
    said pneumatic switch being actuatable upon opening of said door so as to cause said air cylinder to retract from said filter.

9. The apparatus for removing oil from an oil filter according to claim 1, wherein said housing has, between said oil receiving holes and said container, a chamber having a wire mesh baffle therein, and a funnel shaped plate having a drain hole for draining oil into said container.

* * * * *